US011455426B2

(12) United States Patent
Lee et al.

(10) Patent No.: US 11,455,426 B2
(45) Date of Patent: Sep. 27, 2022

(54) VEHICLE INFORMATION INQUIRY METHOD

(71) Applicant: LG ELECTRONICS INC., Seoul (KR)

(72) Inventors: Sangwook Lee, Seoul (KR); Kyusuk Han, Seoul (KR); Junsang Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/490,485

(22) PCT Filed: Jan. 25, 2018

(86) PCT No.: PCT/KR2018/001130
§ 371 (c)(1),
(2) Date: Aug. 30, 2019

(87) PCT Pub. No.: WO2019/146813
PCT Pub. Date: Aug. 1, 2019

(65) Prior Publication Data
US 2020/0349285 A1    Nov. 5, 2020

(51) Int. Cl.
*G06F 21/62* (2013.01)
*G06Q 50/30* (2012.01)
(Continued)

(52) U.S. Cl.
CPC ......... *G06F 21/6254* (2013.01); *G06Q 50/30* (2013.01); *H04L 9/3236* (2013.01);
(Continued)

(58) Field of Classification Search
CPC ............ G06F 21/6254; G06F 16/2228; G06F 16/242; G06F 16/248; G06Q 50/30; H04L 9/3236; H04L 9/3247; H04L 67/12; H04L 2209/84; H04L 63/126; H04L 63/0407; H04L 63/0823; H04L 67/20; H04L 67/18;
(Continued)

(56) References Cited

U.S. PATENT DOCUMENTS

2005/0083211 A1* 4/2005 Shafir ............... G01C 21/3697
340/905
2014/0195098 A1* 7/2014 Lorenz .................. G07C 5/008
701/29.3
(Continued)

FOREIGN PATENT DOCUMENTS

JP             2015141600 A  *  8/2015

*Primary Examiner* — Taghi T Arani
*Assistant Examiner* — Blake I Narramore
(74) *Attorney, Agent, or Firm* — Lee, Hong, Degerman, Kang & Waimey PC

(57) ABSTRACT

Disclosed is a vehicle information inquiry method including a logging step of acquiring an event ID for sharing anonymized vehicle information and vehicle travel information corresponding to the event ID from an external device, by a central server, a query step of receiving an inquiry about the event ID and the vehicle travel information corresponding to the event ID from an inquiry server, by the central server, and a responding step of transmitting the vehicle travel information corresponding to the event ID received from the inquiry server to the inquiry server, by the central server.

14 Claims, 12 Drawing Sheets

(51) Int. Cl.
*H04L 9/32* (2006.01)
*H04L 67/12* (2022.01)

(52) U.S. Cl.
CPC ............ *H04L 9/3247* (2013.01); *H04L 67/12* (2013.01); *H04L 2209/84* (2013.01)

(58) Field of Classification Search
CPC .... H04L 2209/42; H04L 9/32; H04W 12/108; H04W 12/02; H04W 12/069
See application file for complete search history.

(56) References Cited

U.S. PATENT DOCUMENTS

| | | | |
|---|---|---|---|
| 2015/0121071 A1* | 4/2015 | Schwarz | H04L 63/08 |
| | | | 713/168 |
| 2018/0012433 A1* | 1/2018 | Ricci | G06Q 20/108 |
| 2018/0026949 A1* | 1/2018 | Kimn | H04L 9/0827 |
| | | | 713/156 |
| 2018/0211543 A1* | 7/2018 | Wei | G06Q 10/0833 |
| 2019/0007215 A1* | 1/2019 | Hakuta | H04W 12/069 |
| 2019/0025818 A1* | 1/2019 | Mattingly | G05D 1/104 |
| 2019/0044728 A1* | 2/2019 | Karmoose | H04L 9/12 |
| 2019/0068582 A1* | 2/2019 | Kim | G07C 5/008 |

* cited by examiner

VEHICLE INFORMATION INQUIRY METHOD

CROSS-REFERENCE TO RELATED APPLICATIONS

This application is the National Stage filing under 35 U.S.C. 371 of International Application No. PCT/KR2018/001130, filed on Jan. 25, 2018, the contents of which are all hereby incorporated by reference herein in its entirety.

TECHNICAL FIELD

The present invention relates to a logging and inquiry method of vehicle information.

BACKGROUND ART

A vehicle is a device that carries passengers in a direction intended by the passenger. A car is a major example of such a vehicle.

A vehicle may generate vehicle information while traveling. For example, the vehicle information may include information related to traveling of a vehicle, information related to a driver, information about the surrounding environment in which the vehicle travels, and the like.

As necessary, a third party who is not a driver of a vehicle needs vehicle information. For example, the third party may inquire about the traveling record of a vehicle in order to calculate an insurance fee for the vehicle. In general, vehicle information is stored in a vehicle, and in order to inquire about the vehicle information, a method of directly accessing the vehicle or acquiring information through communication with the vehicle is used.

However, when vehicle information of numerous vehicles is required, a long time and larger efforts are incurred to directly query each vehicle about vehicle information and to acquire the vehicle information.

The vehicle information may include personal information of a vehicle or a driver. For example, information related to a place to which the vehicle travels at a specific time point is related to the personal life of an individual, and thus there is the probability of a legal issue and there is the concern about abuse of the information by a third party.

Accordingly, as necessary, there is a need to develop a method of inquiring about vehicle information for enabling a third party who is not directly related to a vehicle to inquire about vehicle information while preventing the unnecessary leakage of personal information.

DISCLOSURE

Technical Problem

It is an object of the present invention to provide a vehicle information inquiry method for enabling a third party to conveniently inquire about vehicle travel information.

It is another object of the present invention to provide a vehicle information inquiry method for preventing unnecessary leakage of personal information when vehicle information is provided.

It is another object of the present invention to provide a vehicle information inquiry method for reacting to a risk of forging or falsifying data during a procedure of transmitting and receiving data.

The technical problems solved by the embodiments are not limited to the above technical problems and other technical problems which are not described herein will become apparent to those skilled in the art from the following description.

Technical Solution

In accordance with the present invention, the above and other objects can be accomplished by the provision of a vehicle information inquiry method including a logging step of acquiring an event ID for sharing anonymized vehicle information and vehicle travel information corresponding to the event ID from an external device, by a central server, a query step of receiving an inquiry about the event ID and the vehicle travel information corresponding to the event ID from an inquiry server, by the central server, and a responding step of transmitting the vehicle travel information corresponding to the event ID (hereinafter, 'queried event ID') received from the inquiry server to the inquiry server, by the central server.

Details of other embodiments are included in a detailed description and drawings.

Advantageous Effects

According to the above technical solution, embodiments of the present invention may provide one or more of the following effects.

First, vehicle travel information may be stored in a server outside a vehicle, and a third party may inquire about the vehicle information, thus making it convenient to obtain the vehicle information.

Second, anonymized vehicle information may be shared, and thus the security of personal information related to a vehicle in addition to required vehicle information may be maintained.

Third, authentication for verifying the integrity of data may be included in order to provide accurate and uncompromised information.

The effects of the present invention are not limited to the above-described effects and other effects which are not described herein may be derived by those skilled in the art from the following description of the embodiments of the disclosure.

BEST MODE

Figure 1:
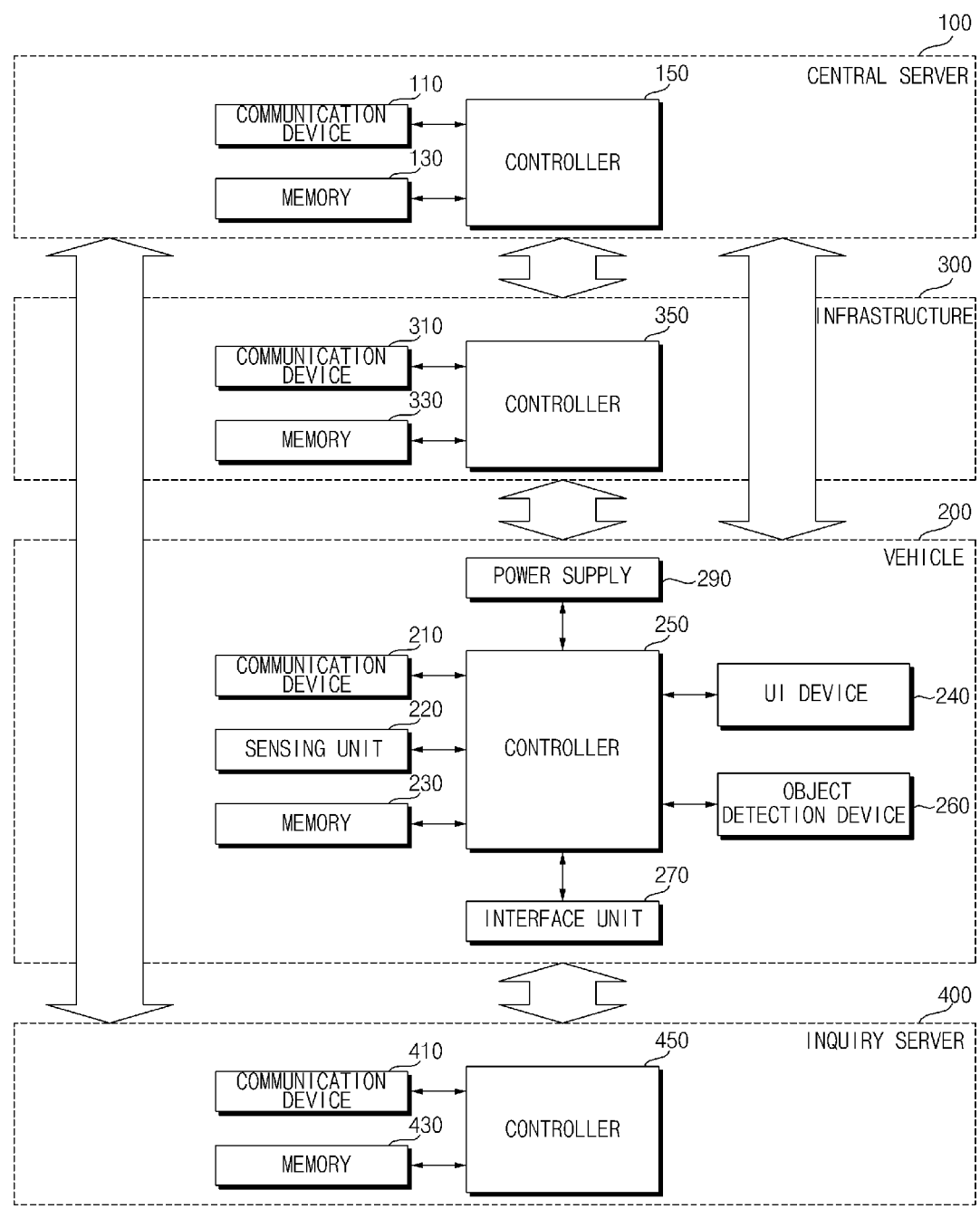
FIG. 1 is a block diagram showing a configuration of a central server, an infrastructure, a vehicle, and an inquiry server according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

First Embodiment

<Configuration>

FIG. 1 is a block diagram showing a configuration of a central server, an infrastructure, a vehicle, and an inquiry server according to an embodiment of the present invention.

Figure 2:
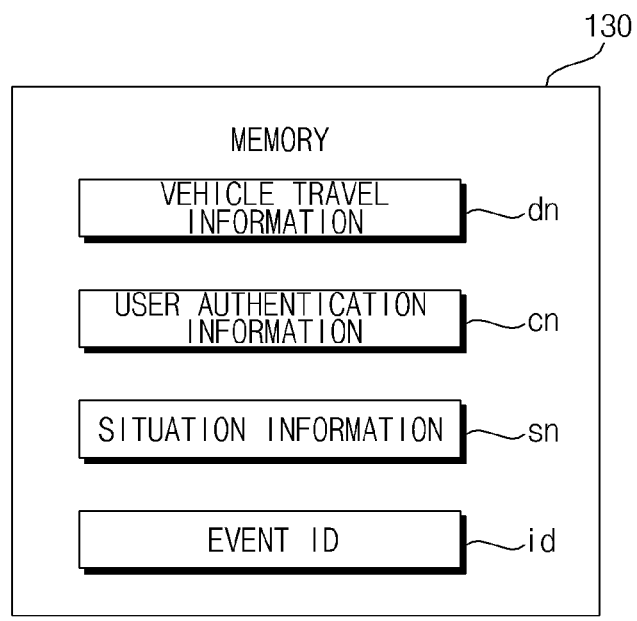
FIG. 2 is a block diagram for explanation of a memory of a central server according to an embodiment of the present invention.

FIG. 2 is a block diagram for explanation of a memory of a central server according to an embodiment of the present invention.

Figure 3:
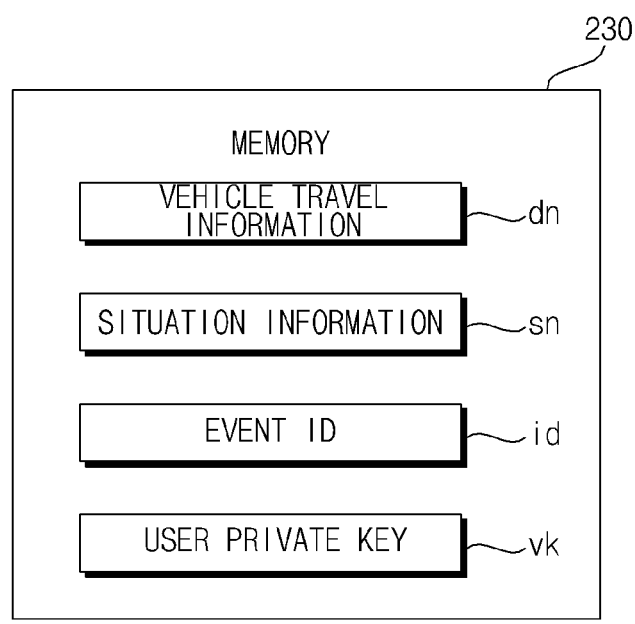
FIG. 3 is a block diagram for explanation of a memory of a vehicle according to an embodiment of the present invention.

FIG. 3 is a block diagram for explanation of a memory of a vehicle according to an embodiment of the present invention.

Referring to FIG. 1, a central server 100 may include a communication device 110, a memory 130, and a controller 150.

The communication device 110 is used to communicate with an external device. The external device may be a vehicle, a mobile terminal, or another server.

The communication device 110 may include at least one of a transmission antenna and a reception antenna, for communication, or a Radio Frequency (RF) circuit and device, for implementing various communication protocols.

The communication device 110 may include a short-range communication unit 111, a location information unit 112, an optical communication unit 114, a broadcasting transceiver unit 115, an intelligent transport systems (ITS) communication unit 116, and a processor 117.

In some embodiments, the communication device 110 may further include a new component in addition to the components described below, or may not include some of the described components.

The short-range communication unit 111 is a unit for conducting short-range communication. The short-range communication unit 111 may support short-range communication, using at least one of Bluetooth™, Radio Frequency Identification (RFID), Infrared Data Association (IrDA), Ultra Wideband (UWB), ZigBee, Near field Communication (NFC), Wireless Fidelity (Wi-Fi), Wi-Fi Direct, or Wireless Universal Serial Bus (Wireless USB).

The short-range communication unit 111 may conduct short-range communication between the server 100 and at least one external device by establishing a wireless area network.

The location information unit 112 is a unit configured to acquire information about a location of the central server 100. For example, the location information unit 112 may include a global positioning system (GPS) module or a differential global positioning system (DGPS) module.

The optical communication unit 114 is a unit for communicating with an external device using light. The optical communication unit 114 may include an optical transmitter for converting an electrical signal to an optical signal and emitting the optical signal to the outside, and an optical receiver for converting a received optical signal to an electrical signal.

The broadcasting transceiver unit 115 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The memory 130 may be electrically connected to a controller 150. The memory 130 may store basic data of a predetermined unit, control data for controlling an operation of a predetermined unit, and input and output data.

The memory 130 may be various storage devices such as ROM, RAM, EPROM, a flash drive, and a hard drive in terms of hardware. The memory 130 may store various data for an overall operation of the vehicle 200, such as a program for processing or controlling the controller 150.

In some embodiments, the memory 130 may be integrated into the controller 150 or may be embodied as a low ranking component of the controller 150.

Referring to FIG. 2, the memory 130 may store vehicle travel information dn, user authentication information cn, situation information sn, and event ID id.

The vehicle travel information dn may be information related to traveling of a vehicle 200.

The vehicle travel information dn may include vehicle state information that will be described below.

The vehicle travel information dn may include information on at least one of a location, a past route, a predicted route, a speed, passengers, or a control state of a vehicle.

The user authentication information cn is used to check the integrity of data when the data is shared for communication.

The user authentication information cn may include a user public key for verifying authentication information on which a digital signature is performed using a user private key vk.

The user authentication information cn may include user signature that is information on which a digital signature is performed using the user private key vk. The user authentication information cn may include user certificate of user signature.

The situation information sn may include location information and time information.

The situation information sn may include information on a location of the vehicle 200 or a time at which the vehicle 200 generates the vehicle travel information dn.

The situation information sn may include information on a location of a device that generates the situation information sn and information on a time at which the situation information sn is generated.

The situation information sn may include information on a location of an infrastructure 300 or a time at which the infrastructure 300 generates the situation information sn.

The situation information sn may include information on infrastructure ID of the infrastructure 300.

The event ID id may be used to anonymize and share vehicle information.

With regard to the event ID id, unique event ID id may be generated for each vehicle.

The event ID id may be differently generated depending on a space or a time in spite of the same vehicle.

For example, the event ID id may be generated based on situation information and user authentication information.

For example, the event ID id may be a hash value of data obtained by combining situation information and user authentication information.

As such, during an inquiry about vehicle information, vehicle information corresponding to the event ID id may be queried instead of unique information of a vehicle, and thus unnecessary leakage of personal information may be advantageously prevented.

The controller 150 may control an overall operation of each unit in the central server 100.

The controller 150 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The communication device 110 and the memory 130 may have individual processors or may be integrated into the controller 150.

The vehicle 200 may include a communication device 210, a sensing unit 220, a memory 230, a user interface (UI) device 240, a controller 250, and a power supply 290.

In some embodiments, the vehicle 200 may not include some of the described components or may further include a new component in addition to the components described below.

The communication device 210 is used to communicate with an external device. The external device may be another vehicle, a mobile terminal, or a server.

The communication device 210 may include at least one of a transmission antenna and a reception antenna, for communication, or a Radio Frequency (RF) circuit and device, for implementing various communication protocols.

The communication device 210 may include a short-range communication unit 211, a location information unit 212, a vehicle-to-everything (V2X) communication unit 213, an optical communication unit 214, a broadcasting transceiver unit 215, an intelligent transport systems (ITS) communication unit 216, and a processor 217.

In some embodiments, the communication device 210 may further include a new component in addition to the components described below, or may not include some of the described components.

The description of the communication device 110 of the server 100 may be applied to components of the communication device 210, which have the same names as in the communication device 110 of the central server 100.

The V2X communication unit 213 is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit 213 may include an RF circuit capable of implementing a V2I protocol, a V2V protocol, and a V2P protocol.

The optical communication unit 214 may be integrated into a lamp included in the vehicle 200.

The ITS communication unit 216 may exchange information, data, or signals with a traffic system. The ITS communication unit 216 may provide acquired information and data to the traffic system. The ITS communication unit 216 may receive information, data, or a signal from the traffic system. For example, the ITS communication unit 216 may receive traffic information from the traffic system and provide the received traffic information to the controller 250. For example, the ITS communication unit 216 may receive a control signal from the traffic system, and provide the received control signal to the controller 250 or a processor in the vehicle 200.

The sensing unit 220 may sense a vehicle state. The sensing unit 220 may include a posture sensor (e.g., a yaw sensor, a roll sensor, a pitch sensor), a collision sensor, a wheel sensor, a speed sensor, an inclination sensor, a weight detection sensor, a heading sensor, a gyro sensor, a position module, vehicle drive/reverse sensor, a battery sensor, a fuel sensor, a tire sensor, a steering sensor for rotation of the steering wheel, an in-vehicle temperature sensor, an in-vehicle humidity sensor, an ultrasonic sensor, an illuminance sensor, an acceleration pedal position sensor, a brake pedal position sensor, and so on.

The sensing unit 220 may acquire a sensing signal of vehicle posture information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 220 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 220 may generate vehicle state information based on the sensing data. The vehicle state information may be generated based on data detected by various sensors included in the vehicle.

For example, the vehicle state information may include vehicle posture information, vehicle collision information, vehicle location information, vehicle angle information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The memory 230 may be electrically connected to the controller 250. The memory 130 may store basic data of a predetermined unit, control data for controlling an operation of a predetermined unit, and input and output data.

The memory 230 may be various storage devices such as ROM, RAM, EPROM, a flash drive, and a hard drive in terms of hardware. The memory 230 may store various data for an overall operation of the vehicle 200, such as a program for processing or controlling the controller 250.

In some embodiments, the memory 230 may be integrated into the controller 250 or may be embodied as a low ranking component of the controller 250.

Referring to FIG. 3, the memory 230 may store the vehicle travel information dn, the situation information sn, the event ID id, and the user private key vk.

The vehicle travel information dn may include information related to traveling of the vehicle 200.

The vehicle travel information dn may include information on at least one of a location, a past route, a predicted route, a speed, passengers, or a control state of a vehicle.

The vehicle travel information dn may include information acquired from the sensing unit 220, the UI device 240, an object detection device 260, and the controller 250.

The vehicle travel information dn may include vehicle state information acquired from the sensing unit 220.

The vehicle travel information dn may include user gaze information, user gesture information, user input information, and user biometric information, acquired from the UI device 240.

The vehicle travel information dn may include information on a traveling route, acquired from the object detection device 260.

The traveling route may be information included in object information generated by the object detection device 260.

The traveling route may be an actual traveling route of the vehicle 200.

The vehicle travel information do may include information on the traveling route, acquired from the controller 250.

The information on the traveling route may be information generated by the controller 250 based on the object information.

The traveling route may be a route along which the vehicle 200 is supposed to travel.

The situation information sn may include location information and time information.

The situation information sn may include information on a location of a device that generates the situation information sn and information on a time at which the situation information sn is generated.

The situation information sn may include information on a location or time of the vehicle 200.

The situation information sn may include location information of the vehicle 200, acquired from the sensing unit 220.

The situation information sn may include information on the time at which information is stored.

The situation information sn may include location information and time information of the infrastructure 300, acquired through the communication device 210.

The event ID id may be generated by the controller 250 based on the situation information sn and the user authentication information cn.

For example, the event ID id may be a hash value of data obtained by combining the situation information sn and the user authentication information cn.

The user private key vk may be information that is encrypted by performing a digital signature on information.

Information on which a digital signature is performed using the user private key vk may be verified using a user public key.

The UI device 240 may include an input unit 241, an internal camera 242, a biometric sensing unit 243, an output unit 250, and a processor 247. Each component of the UI device 240 may be functionally separate from or integrated into the interface unit 270.

In some embodiments, the UI device 240 may further include a new component in addition to the components described below, or may not include some of the described components.

The input unit 241 is provided to receive information from a user. Data collected by the input unit 241 may be analyzed by the processor 247 and processed as a control command from the user.

The input unit 241 may be disposed inside the vehicle. For example, the input unit 241 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 241 may include a voice input unit, a gesture input unit, a touch input unit, and a mechanical input unit.

The voice input unit may convert a voice input of the user to an electrical signal. The electrical signal may be provided to the processor 247 or the controller 250.

The voice input unit may include one or more microphones.

The gesture input unit may convert a gesture input of the user to an electrical signal. The electrical signal may be provided to the processor 247 or the controller 250.

The gesture input unit may include at least one of an infrared (IR) sensor or an image sensor, for sensing a gesture input of the user.

In some embodiments, the gesture input unit may sense a three-dimensional (3D) gesture input of the user. For this purpose, the gesture input unit may include a light output unit for emitting a plurality of IR rays or a plurality of image sensors.

The gesture input unit may sense a 3D gesture input of the user by Time of Flight (ToF), structured light, or disparity.

The touch input unit may convert a touch input of the user to an electrical signal. The electrical signal may be provided to the processor 247 or the controller 250.

The touch input unit may include a touch sensor for sensing a touch input of the user.

In some embodiments, a touch screen may be configured by integrating the touch input unit with a display unit 251. The touch screen may provide both an input interface and an output interface between the vehicle 100 and the user.

The mechanical input unit may include at least one of a button, a dome switch, a jog wheel, or a jog switch. An electrical signal generated by the mechanical input unit may be provided to the processor 247 or the controller 250.

The mechanical input unit may be disposed on the steering wheel, the center fascia, the center console, the cockpit module, a door, or the like.

The internal camera 242 may acquire an image of the interior of a vehicle. The processor 247 may sense a state of a user based on the image of the interior of a vehicle. The processor 247 may acquire information about the gaze of a user in the image of the interior of a vehicle. The processor 247 may sense the user's gesture in the image of the interior of a vehicle.

The biometric sensing unit 243 may acquire biometric information about a user. The biometric sensing unit 243 may include a sensor for acquiring biometric information about a user, and may acquire information about a fingerprint, heartbeat, and so on of a user, using the sensor. The biometric information may be used for user authentication.

The processor 247 may control an overall operation of each unit of the UI device 240.

In some embodiments, the UI device 240 may include a plurality of processors 247, or may not include the processor 247.

When the UI device 240 does not include the processor 247, the UI device 240 may be operated under the control of another device or the controller 250 in the vehicle 200.

The UI device 240 may be referred to as a vehicular display device.

The UI device 240 may be operated under the control of the controller 250.

The controller 250 may control an overall operation of each unit in the central server 100.

The controller 250 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The communication device 210, the sensing unit 220, the memory 230, the UI device 240, the object detection device 260, the interface unit 270, and the power supply 290 may have individual processors or may be integrated into the controller 250.

The object detection device 260 is used to detect an object outside the vehicle 200. The object detection device 260 may generate object information based on sensing data.

The object information may include information indicating presence or absence of an object, information about the location of an object, information indicating the distance between the vehicle 200 and the object, and information about a relative speed of the vehicle 200 with respect to the object.

The object may be various objects related to driving of the vehicle 200.

The object detection device 260 may include a camera 261, a Radio Detection and Ranging (RADAR) 262, a Light Detection and Ranging (LiDAR) 263, an ultrasonic sensor 264, an IR sensor 265, and a processor 267. Each component of the object detection device 260 may be functionally separate from or integrated into the aforementioned sensing unit 120.

In some embodiments, the object detection device 260 may further include a new component in addition to the components described below, or may not include some of the described components.

To acquire a vehicle exterior image, the camera 261 may be disposed at an appropriate position on the exterior of the vehicle. The camera 261 may be a mono camera, a stereo camera 261*a*, around view monitoring (AVM) cameras 261*b*, or a 360-degree camera.

The camera 261 may acquire information about the location of an object, information about a distance to the object, or information about a relative speed with respect to the object by any of various image processing algorithms.

For example, the camera 261 may acquire information about a distance to an object and information about a relative speed with respect to the object in an acquired image, based on a variation in the size of the object over time.

For example, the camera 261 may acquire information about a distance to an object and information about a relative speed with respect to the object through a pin hole model, road surface profiling, or the like.

For example, the camera 261 may acquire information about a distance to an object and information about a relative speed with respect to the object based on disparity information in a stereo image acquired by the stereo camera 261*a*.

For example, to acquire an image of the front view of the vehicle, the camera 261 may be disposed in the vicinity of a front windshield inside the vehicle. Alternatively, the camera 261 may be disposed around a front bumper or a radiator grille.

For example, to acquire an image of what lies behind the vehicle, the camera 261 may be disposed in the vicinity of a rear glass inside the vehicle. Alternatively, the camera 261 may be disposed around a rear bumper, a trunk, or a tail gate.

For example, to acquire an image of what lies beside the vehicle, the camera 261 may be disposed in the vicinity of at least one of side windows inside the vehicle. Alternatively, the camera 261 may be disposed around a side view mirror, a fender, or a door.

The camera 261 may provide an acquired image to the processor 267.

The RADAR 262 may include an electromagnetic wave transmitter and an electromagnetic wave receiver. The RADAR 262 may be implemented by pulse RADAR or continuous wave RADAR. The RADAR 262 may be implemented by Frequency Modulated Continuous Wave (FMCW) or Frequency Shift Keying (FSK) as a pulse RADAR scheme according to a signal waveform.

The RADAR 262 may detect an object in time of flight (TOF) or phase shifting by electromagnetic waves, and determine the location, distance, and relative speed of the detected object.

The RADAR 262 may be disposed at an appropriate position on the exterior of the vehicle in order to sense an object ahead of, behind, or beside the vehicle.

The LiDAR 263 may include a laser transmitter and a laser receiver. The LiDAR 263 may be implemented in time of flight (TOF) or phase shifting.

The LiDAR 263 may be implemented in a driven or non-driven manner.

If the LiDAR 263 is implemented in the driven manner, the LiDAR 263 may be rotated by a motor and detect an object around the vehicle 200.

If the LiDAR 263 is implemented in a non-driven manner, the LiDAR 263 may detect an object within a predetermined range from the vehicle 200 by optical steering. The vehicle 200 may include a plurality of non-driven LiDAR 263.

The LiDAR 263 may detect an object in TOF or phase shifting by laser light, and may determine the location, distance, and relative speed of the detected object.

The LiDAR 263 may be disposed at an appropriate position on the exterior of the vehicle in order to sense an object ahead of, behind, or beside the vehicle.

The ultrasonic sensor 264 may include an ultrasonic wave transmitter and an ultrasonic wave receiver. The ultrasonic sensor 264 may detect an object by ultrasonic waves, and determine the location, distance, and relative speed of the detected object.

The ultrasonic sensor 264 may be disposed at an appropriate position on the exterior of the vehicle 100 in order to sense an object ahead of, behind, or beside the vehicle.

The IR sensor 265 may include an IR transmitter and an IR receiver. The IR sensor 265 may detect an object by IR light, and determine the location, distance, and relative speed of the detected object.

The IR sensor 265 may be disposed at an appropriate position on the exterior of the vehicle in order to sense an object ahead of, behind, or beside the vehicle.

The processor 267 may control an overall operation of each unit of the object detection device 260.

The processor 267 may compare data sensed by the camera 261, the RADAR 262, the LiDAR 263, the ultrasonic sensor 264, and the IR sensor 265 with pre-stored data to detect or classify an object.

The processor 267 may detect and track an object based on the acquired image. The processor 267 may calculate a distance to the object, a relative speed with respect to the object, and so on by an image processing algorithm.

For example, the processor 267 may acquire information about a distance to an object and information about a relative speed with respect to the object from an acquired image, based on a variation in the size of the object over time.

For example, the processor 267 may acquire information about a distance to an object and information about a relative speed with respect to the object through a pin hole model, road surface profiling, or the like.

For example, the processor 267 may acquire information about a distance to an object and information about a relative speed with respect to the object based on disparity information in a stereo image acquired by the stereo camera 261a.

The processor 267 may detect an object and track the detected object based on electromagnetic waves which are transmitted, are reflected from an object, and then return.

The processor 267 may calculate a distance to the object and a relative speed with respect to the object, based on the electromagnetic waves.

The processor 267 may detect an object and track the detected object based on laser light which is transmitted, is reflected from an object, and then returns. The processor 267 may calculate a distance to the object and a relative speed with respect to the object, based on the laser light.

The processor 267 may detect an object and track the detected object based on ultrasonic waves which are transmitted, are reflected from an object, and then return. The processor 267 may calculate a distance to the object and a relative speed with respect to the object, based on the ultrasonic waves.

The processor 267 may detect an object and track the detected object based on IR light which is transmitted, is reflected from an object, and then returns. The processor 267 may calculate a distance to the object and a relative speed with respect to the object, based on the IR light.

In some embodiments, the object detection device 260 may include a plurality of processor 267 or no processor 267. For example, the camera 261, the RADAR 262, the LiDAR 263, the ultrasonic sensor 264, and the IR sensor 265 may include individual processors.

If the object detection device 260 includes no processor 267, the object detection device 260 may operate under control of a processor of a device in the vehicle 200 or under control of the controller 250.

The object detection device 260 may operate under control of the controller 250.

The interface unit 270 may electrically connect various devices included in the vehicle 200 to the controller 250.

The interface unit 270 serves as paths to various types of external devices connected to the vehicle 200.

The power supply 290 may supply power required for an operation of each component under control of the controller 250. The power supply 290 may receive power from a battery, etc. in the vehicle 200.

The infrastructure 300 may include a communication device 310, a memory 330, and a controller 350.

The communication device 310 may be electrically connected to the controller 350.

The communication device 310 may include at least some of components of the communication device 110 of the central server 100 or the communication device 210 of the vehicle 200.

The description of the communication device 110 of the central server 100 or the communication device 210 of the vehicle 200 may be applied to the communication device 310.

The memory 330 may be electrically connected to the controller 350.

The description of the memory 130 of the central server 100 or the memory 230 of the vehicle 200 may be applied to the memory 330.

The controller 350 may control an overall operation of each unit in the infrastructure 300.

The description of the controller 150 of the central server 100 or the controller 250 of the vehicle 200 may be applied to the controller 350.

An inquiry server 400 may include a communication device 410, a memory 430, and a controller 450.

The communication device 410 may be electrically connected to the controller 450.

The communication device 410 may include at least some of components of the communication device 110 of the central server 100 or the communication device 210 of the vehicle 200.

The description of the communication device 110 of the central server 100 or the communication device 210 of the vehicle 200 may be applied to the communication device 410.

The memory 430 may be electrically connected to the controller 450.

The description of the memory 130 of the central server 100 or the memory 230 of the vehicle 200 may be applied to the memory 430.

The controller 450 may control an overall operation of each unit in the inquiry server 400.

The description of the controller 150 of the central server 100 or the controller 250 of the vehicle 200 may be applied to the controller 450.

<Overall Procedure of Vehicle Information Inquiry Method>

Figure 4:
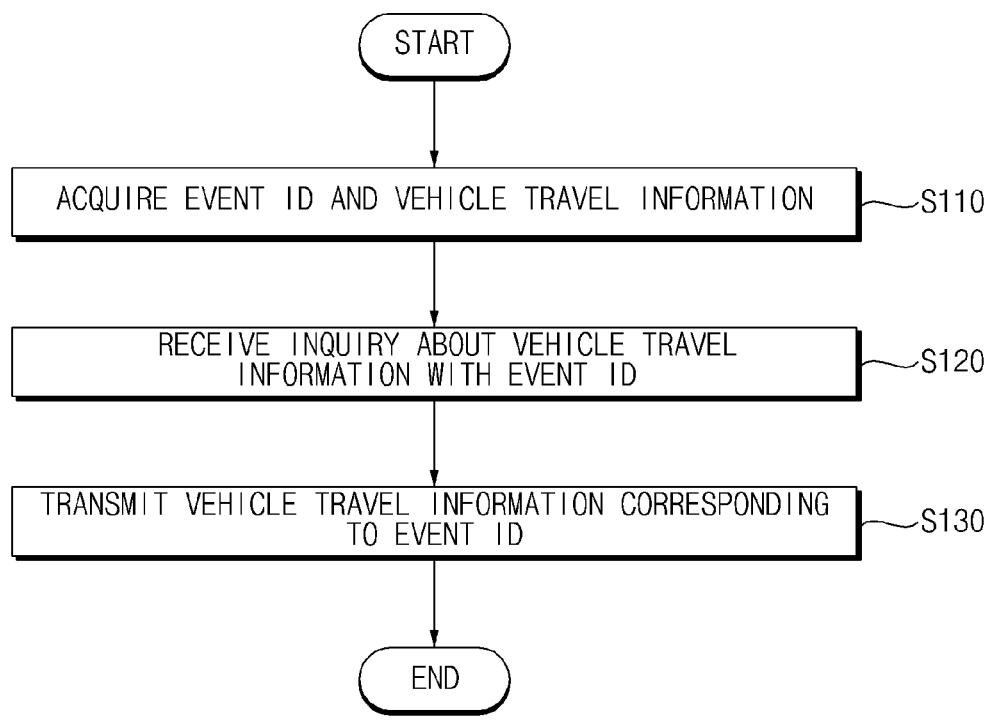
FIG. 4 is a flowchart for explanation of a central server for performing a vehicle information inquiry method according to an embodiment of the present invention.

FIG. 4 is a flowchart for explanation of a central server for performing a vehicle information inquiry method according to an embodiment of the present invention.

Referring to FIG. 4, the central server 100 may acquire the event ID id for sharing anonymized vehicle information and the vehicle travel information do corresponding to the event ID id, from an external device (S110).

The anonymized vehicle information may be information on a vehicle, and may be defined as information for identifying a vehicle as the entity corresponding to the information when it is not possible to identify the vehicle as the entity corresponding to the information using only the anonymized vehicle and the corresponding information is applied through a separate process.

For example, a third party is not capable of recognizing a vehicle that corresponds to anonymized vehicle information, but a plurality of pieces of the anonymized vehicle information may be used to determine a trend, such as the amount of traffic on the road.

The anonymized vehicle information may be used to acquire the event ID id of a vehicle of interest corresponding to the anonymized vehicle information and to inquire about the anonymized vehicle information of the acquired event ID id by a third party.

The central server 100 may acquire the event ID id and the vehicle travel information dn corresponding thereto from an external device through the communication device 110.

The vehicle travel information dn may include information on at least one of a location, a past route, a predicted route, a speed, passengers, and a control state of a vehicle.

The central server 100 may acquire the vehicle travel information dn from the vehicle 200.

Alternatively, the central server 100 may acquire the vehicle travel information do from the infrastructure 300.

The central server 100 may acquire the situation information sn and the user authentication information cn from an external device.

The central server 100 may acquire at least one of the situation information sn or the user authentication information cn from the vehicle 200.

Alternatively, the central server 100 may acquire at least one of the situation information sn or the user authentication information cn from the infrastructure 300.

The event ID id may be a hash value of data obtained by combining the situation information sn and the user authentication information cn.

The hash value may be a value obtained using a hash function. The hash function may be a function for mapping data having an arbitrary length to data having a fixed length. The hash function needs to be deterministically executed, and thus when two hash values are different, original data for the hash values needs to be different.

The user authentication information cn may include a user public key for verifying authentication information on which a digital signature is performed using a user private key.

The digital signature may be a method of verifying identification of a transmitter in a public key system (or a public key infrastructure (PKI), in which case a message that is encrypted by a transmitter using a secret key thereof is decrypted by a receiver using a public key of the transmitter.

According to the present embodiment, authentication information on which a digital signature is performed using a user private key may be verified or decrypted using a user public key.

The central server 100 may receive an inquiry about the event ID id and the vehicle travel information dn corresponding to the event ID id, from the inquiry server 400 (S120).

Even if the central server 100 does not receive a separate inquiry with the event ID id from the inquiry server 400, when the central server 100 receives the event ID id, the central server 100 may determine to receive an inquiry about the vehicle travel information dn corresponding to the event ID id.

Alternatively, the central server 100 may receive a separate inquiry along with the event ID id from the inquiry server 400.

The central server 100 may transmit the vehicle travel information dn corresponding to the event ID id (hereinafter, 'queried event ID') received from the inquiry server 400 to the inquiry server 400 (S130).

The central server 100 may store the event ID id and the vehicle travel information dn corresponding to the event ID id in order to determine the event ID id and the vehicle travel information dn corresponding to the event ID id.

Upon receiving an inquiry about the vehicle travel information dn from the inquiry server 400, the central server 100 may identify the vehicle travel information dn corresponding to the event ID id from information stored in the memory 130.

The central server 100 may transmit the identified vehicle travel information dn to the inquiry server 400.

Figure 5:
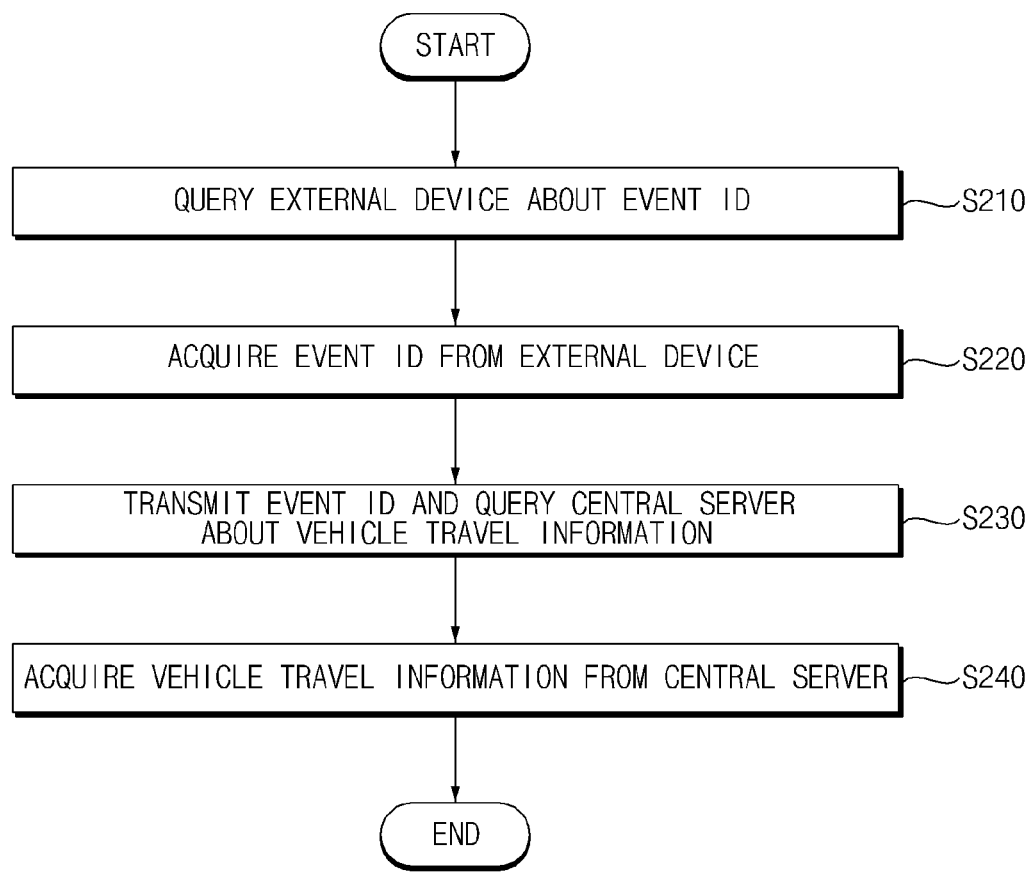
FIG. 5 is a flowchart for explanation of an inquiry server for performing a vehicle information inquiry method according to an embodiment of the present invention.

FIG. 5 is a flowchart for explanation of an inquiry server for performing a vehicle information inquiry method according to an embodiment of the present invention.

The inquiry server 400 may query an external device about the event ID id (S210).

The inquiry server 400 may query the vehicle 200 or the infrastructure 300 about the event ID id.

The inquiry server 400 may acquire the event ID id from the external device (S220).

The inquiry server 400 may acquire the event ID id from the external device through the communication device 410.

The inquiry server 400 may acquire the event ID id from the vehicle 200 or the infrastructure 300. The event ID id may be generated by the vehicle 200 or the infrastructure 300.

The inquiry server 400 may transmit the event ID id and may query the central server 100 about the vehicle travel information dn corresponding to the event ID id (S230).

The inquiry server 400 may transmit the event ID id to the central server 100 and thus may inquire about the vehicle travel information dn corresponding to the event ID id.

In this case, upon receiving the event ID id from the inquiry server 400, the central server 100 may determine that there is an inquiry about the vehicle travel information dn corresponding to the event ID id.

The inquiry server 400 may receive, from the central server 100, the vehicle travel information dn corresponding to the event ID id transmitted from the central server 100 (S240).

Figure 6:
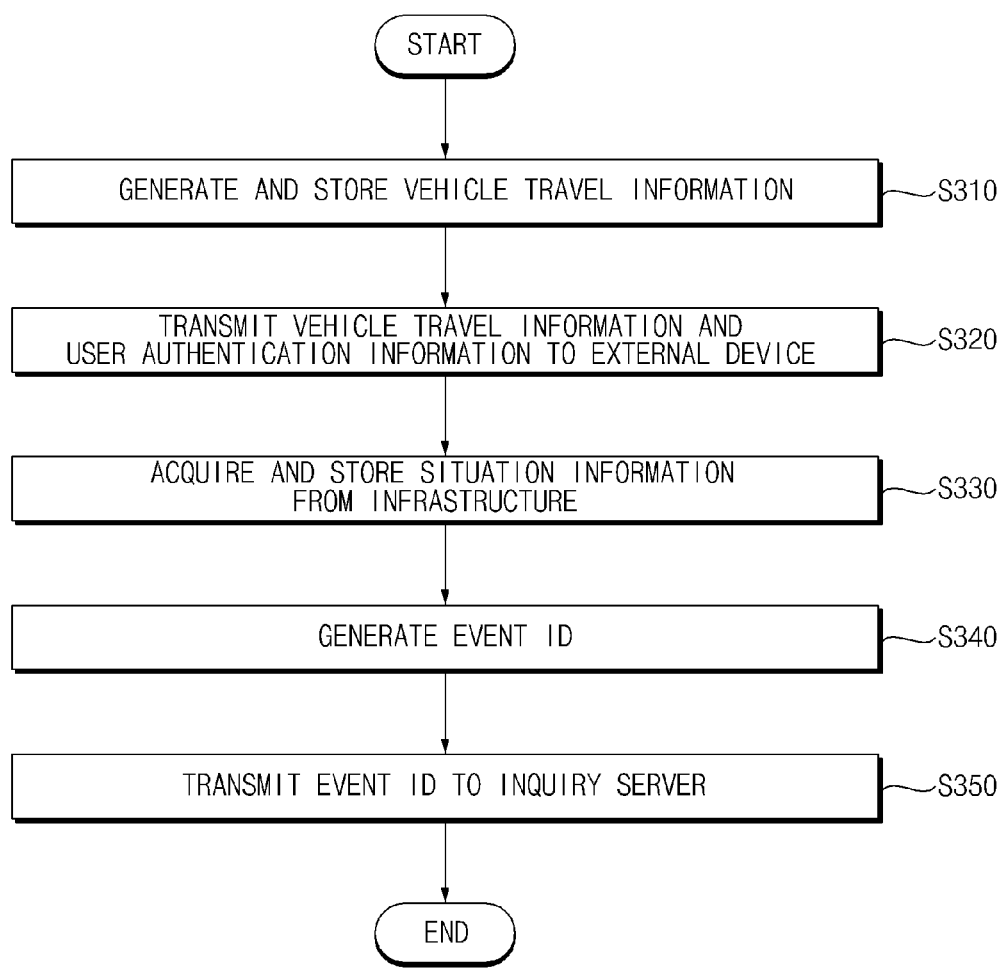
FIG. 6 is a flowchart for explanation of a vehicle for performing a vehicle information inquiry method according to an embodiment of the present invention.

FIG. 6 is a flowchart for explanation of a vehicle for performing a vehicle information inquiry method according to an embodiment of the present invention.

The controller 250 of the vehicle 200 may generate and store the vehicle travel information dn (S310).

The controller 250 may generate the vehicle travel information based on information acquired from at least one of the sensing unit 220, the UI device 240, or the object detection device 260.

The controller 250 may generate the vehicle travel information dn based on vehicle state information acquired from the sensing unit 220.

The vehicle state information may include vehicle posture information, vehicle collision information, vehicle location information, vehicle angle information, vehicle speed information, vehicle inclination information, vehicle weight information, vehicle direction information, vehicle battery information, vehicle fuel information, vehicle tire air pressure information, vehicle steering information, in-vehicle temperature information, in-vehicle humidity information, pedal position information, vehicle engine temperature, and so on.

The controller 250 may generate the vehicle travel information dn based on user input information or user sensing information acquired from the UI device 240.

The user input information may be generated by any one of user voice input, user gesture input, user touch input, and use mechanical input and may be generated by the UI device 240.

The user sensing information may include user gaze information, user gesture information, and user biometric information. The user sensing information may be generated by the UI device 240.

The controller 250 may generate information on a traveling route based on object information acquired from the object detection device 260.

The object information may include information indicating presence or absence of an object, information about the location of an object, information indicating the distance between the vehicle 200 and the object, and information about a relative speed of the vehicle 200 with respect to the object. The object information may be generated by the object detection device 260 based on a signal detected by one or more sensors included in the object detection device 260.

The controller 250 may store the generated vehicle travel information dn in the memory 230.

Although not shown, the controller 250 may also acquire vehicle travel information that is generated by at least one of the sensing unit 220, the UI device 240, or the object detection device 260.

The controller 250 may store the acquired vehicle travel information dn in the memory 230.

The controller 250 may transmit the vehicle travel information dn and the user authentication information cn to the external device (S320).

The controller 250 may control the communication device 210 to transmit the vehicle travel information dn and the user authentication information cn to the infrastructure 300 or the central server 100.

The user authentication information cn may include a user public key. The user public key may be used to verify authentication information on which a digital signature is performed using a user private key.

The user authentication information cn may be acquired from an external device of the vehicle 200 and may be stored in the memory 230. Alternatively, the user authentication information cn may be generated and stored by the controller 250 based on data acquired by an external device of the vehicle 200.

The controller 250 may acquire and store the situation information sn from the infrastructure 300 of a road (S330).

The situation information sn may include information on the location of a device that transmits the situation information sn.

The situation information sn may be generated by the controller 350 of the infrastructure 300.

For example, the situation information sn may include ID of the infrastructure 300 that generates the situation information sn. The infrastructure ID may be unique information of the infrastructure and when the infrastructure ID is known, the location of the corresponding infrastructure 300 may be recognized.

For example, the situation information sn may include location information (GPS) at which the situation information sn is generated.

For example, the situation information sn may include unique information corresponding to a location at which the situation information sn is generated. For example, unique information corresponding to the location at which the situation information sn is generated may be defined as information by which a location at which situation information is generated is not recognized but which corresponds one-to-one to each location. In this case, data generated using the same situation information sn are the same, but data generated using different pieces of situation information sn are not the same.

As such, a plurality of data (e.g., event IDs) generated using the situation information sn may be compared with each other, and thus whether a plurality of data is generated using the same situation information sn may be determined.

The situation information sn may include information on a time at which the situation information sn is generated.

The controller 250 may generate the event ID id based on the situation information sn and the user authentication information cn (S340).

The controller 250 may generate the event ID id for sharing vehicle information in an anonymous state with an external device.

For example, the controller 250 may obtain a hash value of data obtained by combining the situation information sn and the user authentication information cn to generate the event ID id.

When there is an inquiry about the event ID id from the inquiry server 400, the controller 250 may generate the event ID id.

When there is an inquiry about generation of an event ID id corresponding to a specific time period or a specific place from the inquiry server 400, the controller 250 may generate the event ID id of the specific time period or the specific place.

Although not shown, the controller 250 of the vehicle 200 may receive, from the infrastructure 300, the event ID id generated by the infrastructure 300. The controller 250 may store the event ID id acquired from the infrastructure 300, in the memory 230.

Upon receiving an inquiry about the event ID id from the inquiry server 400, the controller 250 may transmit the event ID id stored in the memory 230 to an inquiry server.

The controller 250 may transmit the generated event ID id to the inquiry server 400 in response to an inquiry from the inquiry server 400 (S350).

When there is an inquiry from the inquiry server 400, the controller 250 may control the communication device 210 to transmit the event ID id to the inquiry server 400.

As such, there may be provision of a method of storing anonymized vehicle information and inquiring about vehicle information using an event ID in such a way that a third party inquires about vehicle information when necessary while leakage of personal information of a vehicle and a vehicle user is prevented.

<Logging Step>

Figure 7:
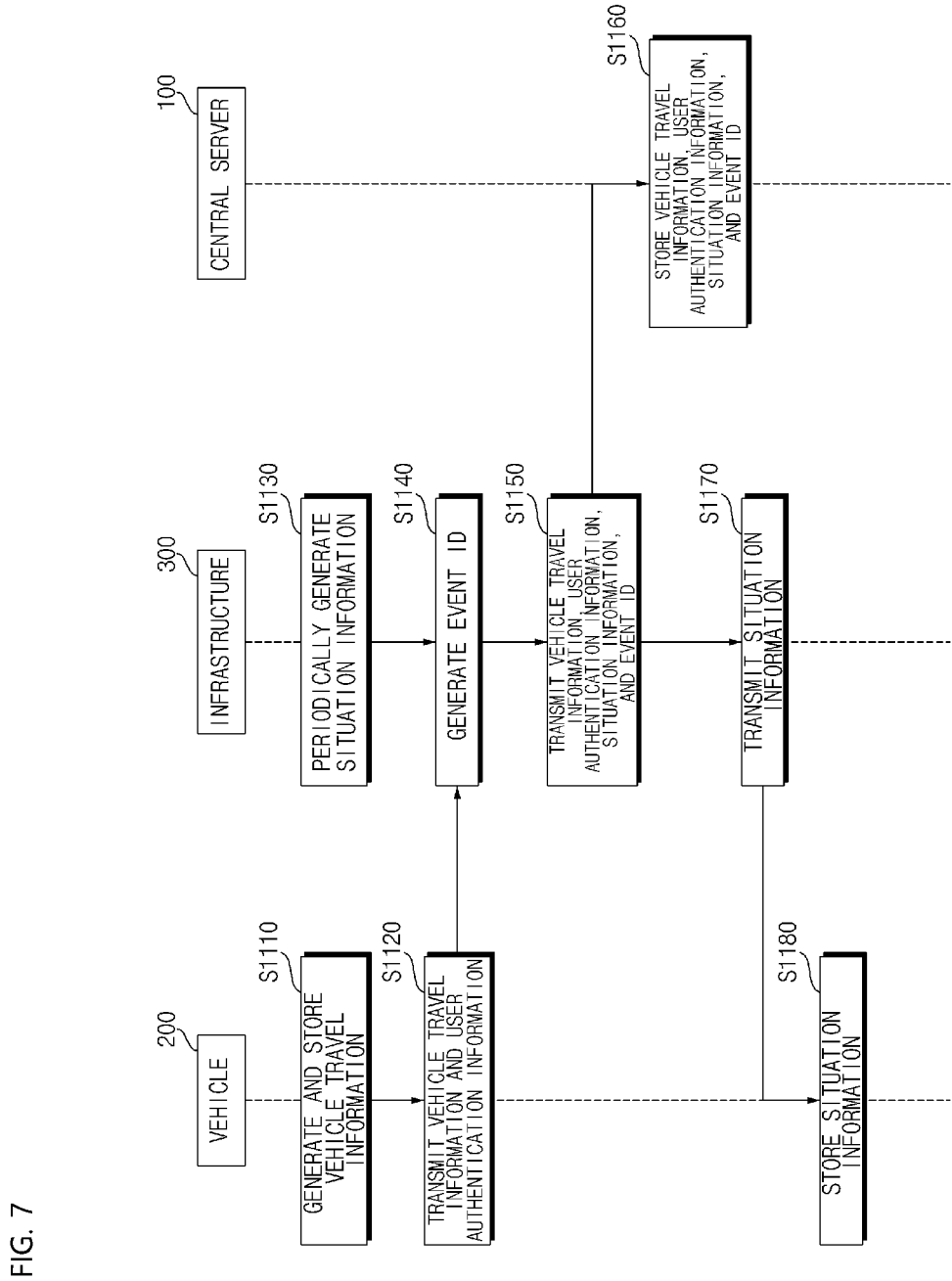
FIG. 7 is a signal flowchart for explanation of a logging step according to an embodiment of the present invention.

FIG. 7 is a signal flowchart for explanation of a logging step according to an embodiment of the present invention.

The logging step may be defined as a step of storing anonymized vehicle information in the central server 100.

Hereinafter, generation, acquisition, transmission, and storage of information by the vehicle 200 may be interpreted as generation, acquisition, transmission, and storage of information by the controller 250 of the vehicle 200 or a processor included in the vehicle 200, and this is for convenience of description.

Hereinafter, generation, acquisition, transmission, and storage of information by the infrastructure 300 may be interpreted as generation, acquisition, transmission, and storage of information by the controller 350 of the infrastructure 300, and this is for convenience of description.

Hereinafter, generation, acquisition, transmission, and storage of information by the central server 100 may be interpreted as generation, acquisition, transmission, and storage of information by the controller 150 of the central server 100, and this is for convenience of description.

Referring to FIG. 7, the vehicle 200 may generate and store the vehicle travel information dn (S1110).

The vehicle 200 may transmit the vehicle travel information dn and the user authentication information cn to the infrastructure 300 (S1120).

The infrastructure 300 may periodically generate the situation information sn (S1130).

The infrastructure 300 may generate the situation information sn at a preset time interval.

The infrastructure 300 may generate the situation information sn at a preset period.

The infrastructure 300 may generate the event ID id based on the user authentication information cn and the situation information sn acquired from the vehicle 200 (S1140).

The infrastructure 300 may obtain a hash value of data obtained by combining the user authentication information cn and the situation information sn to generate the event ID id.

The infrastructure 300 may transmit the vehicle travel information dn, the user authentication information cn, the situation information sn, and the event ID id to the central server 100 (S1150).

The central server 100 may acquire the vehicle travel information dn and the user authentication information cn generated by the vehicle 200.

The central server 100 may acquire the situation information sn that is periodically generated by the infrastructure 300 of a road.

The central server 100 may acquire the event ID id generated by the infrastructure 300 based on the situation information sn and the user authentication information cn.

The central server 100 may acquire the event ID id, the vehicle travel information dn corresponding to the event ID id, the situation information sn, and the user authentication information cn, from the infrastructure 300.

Although not shown, the central server 100 may also acquire the vehicle travel information dn and the user authentication information cn from the vehicle 200. The central server 100 may also acquire the situation information sn and the event ID id from the infrastructure 300.

In this case, the vehicle 200 may acquire the situation information sn from the infrastructure 300, and may generate the event ID id based on the acquired situation information sn and the user authentication information cn. The central server 100 may acquire the vehicle travel information dn corresponding to the event ID id acquired from the infrastructure 300, and the user authentication information cn, from the vehicle 200.

The central server 100 may store the vehicle travel information dn, the user authentication information cn, the situation information sn, and the event ID id in the memory 130 (S1160).

The central server 100 may store the event ID id acquired from the infrastructure 300, the vehicle travel information dn corresponding to the event ID id, the situation information sn, and the user authentication information cn in a lookup table (LUT).

The LUT may be a method of storing data for reducing a time taken to inquire about data or calculate the data by arranging data in the form of an index.

The central server 100 may store the event ID id, the vehicle travel information dn corresponding to the event ID id, the situation information sn, and the user authentication information cn in the LUT, and thus may rapidly find the vehicle travel information dn corresponding to the event ID id, the situation information sn, or the user authentication information cn.

The infrastructure 300 may transmit the situation information sn to the vehicle 200 (S1170).

Alternatively, the infrastructure 300 may periodically broadcast the situation information sn in such a way that one or more devices outside the infrastructure 300 receive the situation information sn.

Although not shown, the infrastructure 300 may also transmit situation information to the vehicle 200 prior to step S1140 of generating the event ID id or step S1150 of transmitting the event ID id or the like to the central server 100.

The vehicle 200 may store the situation information sn received from the infrastructure 300 in the memory 130 (S1180).

<Inquiring and Responding Step>

Figure 8:
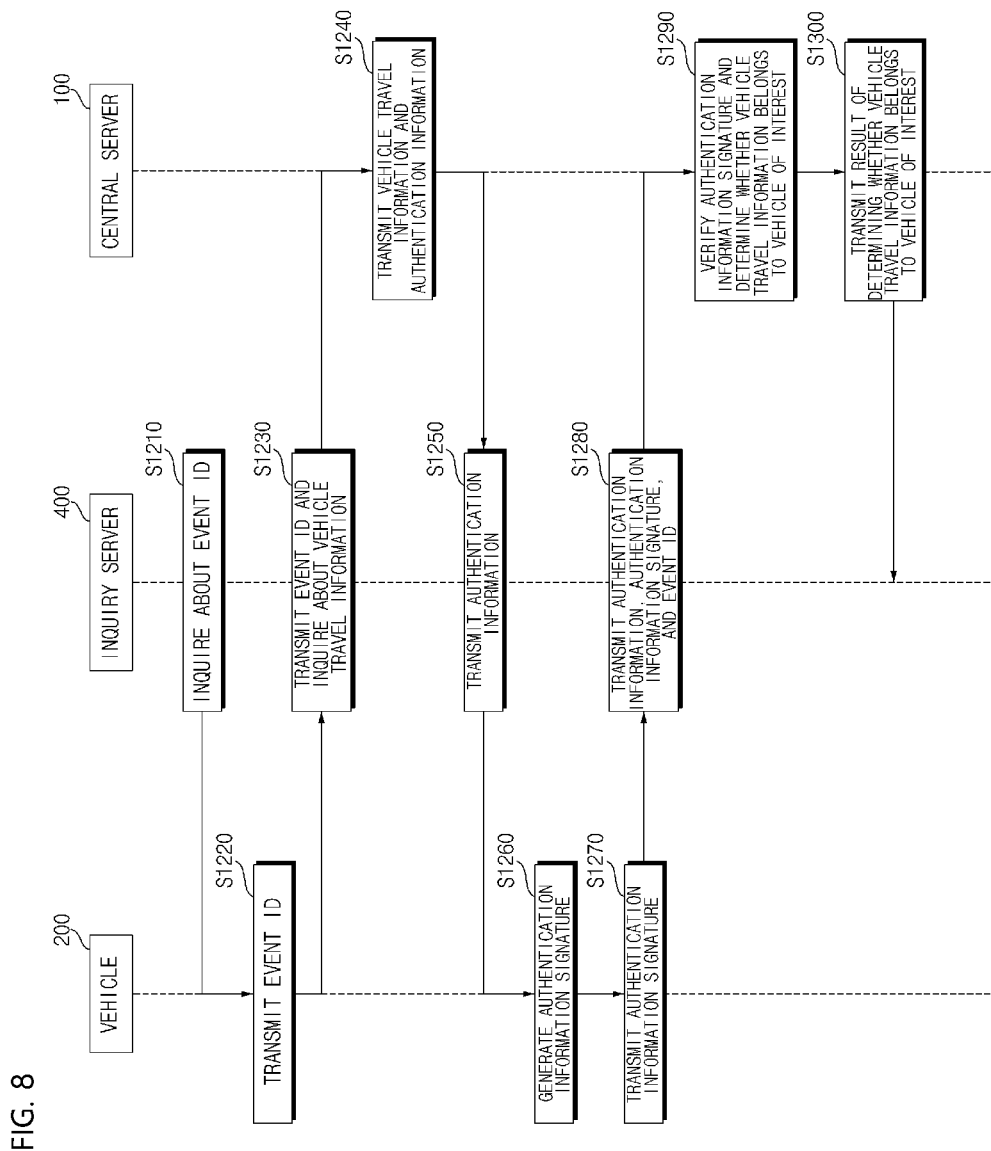
FIG. 8 is a signal flowchart for explanation of an inquiring and responding step according to an embodiment of the present invention.

FIG. 8 is a signal flowchart for explanation of an inquiring and responding step according to an embodiment of the present invention.

A query step may be defined as a step in which the inquiry server 400 queries the central server 100 about vehicle information.

A responding step may be defined as a step in which the central server 100 provides vehicle information in response to an inquiry from the inquiry server 400.

The inquiry server 400 may query a vehicle of interest or a mobile terminal about the event ID id related to vehicle travel information.

Referring to FIG. 8, the inquiry server 400 may query the vehicle 200 about the event ID id (S1210).

The inquiry server 400 may query a vehicle of interest or a mobile terminal about an event ID related to vehicle travel information corresponding to a specific time period or a specific place.

The inquiry server 400 may query a vehicle about the event ID id for acquisition of vehicle information of a desired place or time period.

The inquiry server 400 may transmit information on a desired place or time to the vehicle 200 and may inquire about the event ID id corresponding to the information.

When there is an inquiry from the inquiry server 400, the vehicle 200 may transmit the event ID id to the inquiry server 400 (S1220).

The vehicle 200 may transmit the event ID id corresponding to the queried information to the inquiry server 400.

When there is an inquiry from the inquiry server 400, the vehicle 200 may generate the event ID id and may transmit the generated event ID id to the inquiry server 400.

For example, the vehicle 200 may acquire information on a specific time period or a specific place from the inquiry server 400 and may generate the event ID id corresponding to the acquired information on the specific time period or the specific place.

The vehicle 200 may acquire a hash value of information obtained by combining the information on the specific time period or the specific place and the user authentication information cn to generate the event ID id.

Alternatively, the vehicle 200 may transmit the event ID id stored in the memory 230 to the inquiry server 400. The vehicle 200 may identify the event ID id corresponding to information on the specific time period or the specific place from information of the event ID id stored in the memory 230.

The information of the specific time period or the specific place may be information included in the vehicle travel information dn. The vehicle travel information dn may include information on the specific time period or information on the specific place.

The information on the specific time period or the specific place may be information included in the situation information sn. The situation information sn may include information on the specific time period or information on the specific place.

Alternatively, the inquiry server 400 may acquire the event ID id from a vehicle of interest or a mobile terminal. According to the present embodiment, the event ID id is acquired from the vehicle 200, but the present invention is not limited thereto.

The inquiry server 400 may transmit the event ID id and may query the central server 100 about the vehicle travel information dn (S1230).

Upon receiving an inquiry about the vehicle travel information dn from the inquiry server 400, the central server 100 may transmit authentication information corresponding to the received event ID id to the inquiry server 400 (S1240).

Upon acquiring the event ID id from the inquiry server 400, the central server 100 may determine that there is an inquiry about the vehicle travel information dn and authentication information in response to the event ID id.

The authentication information may be a number used once (nonce) generated by the central server 100. The nonce may be a value that is arbitrarily generated and may be used in encryption. The nonce may be generated as different values at different time points and may be used to update recency of information. The nonce may be used to check integrity of data during communication between different devices.

Upon receiving the vehicle travel information dn and authentication information from the central server 100, the inquiry server 400 may transmit authentication information to the vehicle 200 (S1250).

Upon receiving authentication information from the inquiry server 400, the vehicle 200 may generate an authentication information signature based on authentication information and the user private key vk (S1260).

The vehicle 200 may perform a digital signature on authentication information using the user private key vk to generate an authentication information signature.

The vehicle 200 may transmit the generated authentication information signature to the inquiry server 400 (S1270).

The inquiry server 400 may transmit the authentication information, the authentication information signature, and the event ID id to the central server 100 (S1280).

The inquiry server 400 may transmit the same event ID id as the event ID id, which is transmitted to the central server 100 in order to inquire about the vehicle travel information dn, with the authentication information corresponding to the event ID id and the authentication information signature, to the central server 100.

The central server 100 may acquire an authentication information signature obtained by performing a digital signature on authentication information using the user private key vk, the authentication information, and an event ID, from the inquiry server 400.

The central server 100 may verify the authentication information signature and may determine whether the vehicle travel information dn transmitted from the inquiry server 400 is related to the queried event ID id (S1290).

That is, the central server 100 may determine whether the vehicle travel information dn transmitted from the inquiry server 400 is related to a vehicle of interest.

The central server 100 may verify the acquired authentication information signature based on the user authentication information cn corresponding to the queried event ID id and may determine whether the vehicle travel information dn transmitted to the inquiry server 400 belongs to the vehicle 200 corresponding to the queried event ID id.

The vehicle corresponding to the queried event ID id may be a vehicle, that is, a vehicle of interest that receives an inquiry about the event ID id from the inquiry server 400 and transmits the event ID id to the inquiry server 400.

The central server 100 may verify the authentication information signature using the user public key stored in the central server 100. The central server 100 may determine whether a value resulting from decrypting the authentication information signature using a user public key matches authentication information, and upon determining that the result value matches the authentication information, the central server 100 may determine that the vehicle travel information dn transmitted to the inquiry server 400 belongs to the vehicle 200 that transmits the event ID id.

For example, upon determining that a value obtained by decrypting the authentication information signature using a user public key included in the user authentication information cn is the same as a hash value of the authentication information acquired from the inquiry server 400, the central server 100 may determine that the vehicle travel information dn transmitted to the inquiry server 400 belongs to the vehicle 200 corresponding to the queried event ID id.

The central server 100 may transmit, to the inquiry server 400, the result of determining whether the vehicle travel information dn transmitted to the inquiry server 400 belongs to the vehicle 200 corresponding to the queried event ID id (S1300).

The central server 100 may transmit, to the inquiry server 400, the result of determining whether the vehicle travel information dn transmitted to the inquiry server 400 belongs to the vehicle 200 corresponding to the queried event ID id.

The inquiry server 400 may acquire the result of determining whether the acquired vehicle travel information dn belongs to a vehicle of interest, from the central server 100.

When the acquired vehicle travel information dn does not reside on a vehicle of interest, the inquiry server 400 may again query the vehicle 200 for an event ID (S1210). In this case, the aforementioned steps S1210 to S1300 may be repeatedly performed.

The vehicle information inquiry method configured in this way may advantageously minimize the leakage of personal information of the vehicle 200 and may advantageously establish a database from which a third party is capable of obtaining vehicle information when necessary. That is, a third party (an inquiry server in the present embodiment) may acquire a key (an event ID in the present embodiment) for inquiring about vehicle information (vehicle travel information in the present embodiment) of a vehicle of interest from the vehicle of interest when necessary, may query a server about vehicle information of the vehicle of interest using the acquired key, and may read the vehicle information.

The vehicle information inquiry method may verify whether the vehicle information provided by the third party is information of the vehicle of interest, and thus it may be advantageous for the third party to be capable of reading accurate information on the vehicle 200.

The vehicle information inquiry method may advantageously inquire about vehicle information corresponding to a specific time period or a specific place.

Second Embodiment

<Configuration>

Figure 9:
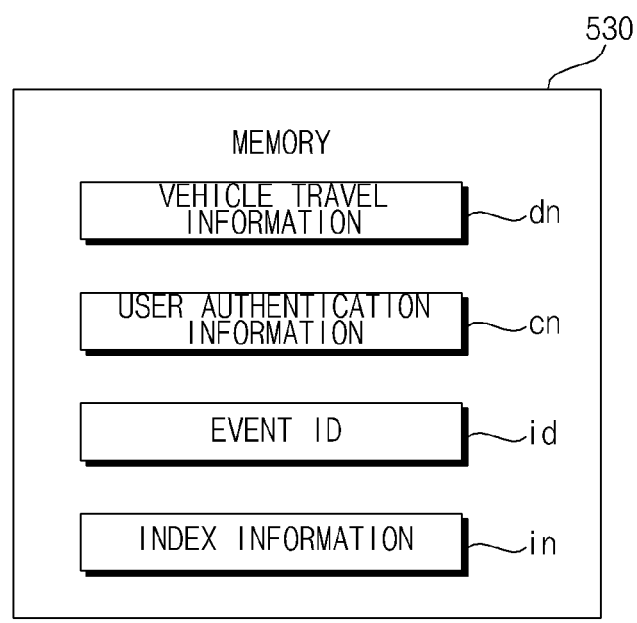
FIG. 9 is a block diagram for explanation of a memory of a main server according to another embodiment of the present invention.

FIG. 9 is a block diagram for explanation of a memory of a main server according to another embodiment of the present invention.

Figure 10:
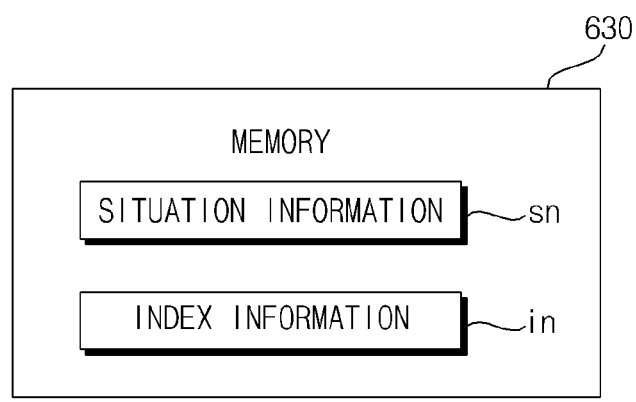
FIG. 10 is a block diagram for a memory of an auxiliary server according to another embodiment of the present invention.

FIG. 10 is a block diagram for a memory of an auxiliary server according to another embodiment of the present invention.

The configuration of the vehicle 200 and the infrastructure 300 according to the second embodiment of the present invention may be the same as the configuration in the first embodiment.

Hereinafter, a detailed description of the same components as in the first embodiment among components of the second embodiment is omitted, and the second embodiment is described below in terms of differences from the first embodiment.

The central server 100 may include a main server 500 and an auxiliary server 600.

The main server 500 and the auxiliary server 600 may be configured in the same way in terms of configuration.

Referring to FIG. 9, the main server 500 may store the event ID id, the vehicle travel information do corresponding to the event ID id, and the user authentication information cn, in a memory 530.

Referring to FIG. 10, the auxiliary server 600 may store situation information in a memory 630.

A controller 650 of the auxiliary server 600 may generate authentication information.

Each of the memory 530 of the main server 500 and the memory 630 of the auxiliary server 600 may store index information in. The index information in may be defined as information for identifying mutually corresponding information in the main server 500 and the auxiliary server 600.

For example, the index information in may be time information included in the vehicle travel information dn or the situation information sn, and the infrastructure ID included in the situation information sn.

For example, the index information in may be the event ID id. In this case, the infrastructure 300 may transmit the event ID id and the situation information sn corresponding to the event ID id, to the auxiliary server 600.

The index information in may be used to identify independent mutually corresponding information in the memory 530 of the main server 500 and the memory 630 of the auxiliary server 600.

For example, when the index information in corresponding to the vehicle travel information dn stored in the main server 500 and the index information in corresponding to the situation information sn stored in the auxiliary server 600 are the same, it may be determined that the vehicle travel information dn and the situation information sn correspond to each other.

<Logging Step>

Figure 11:
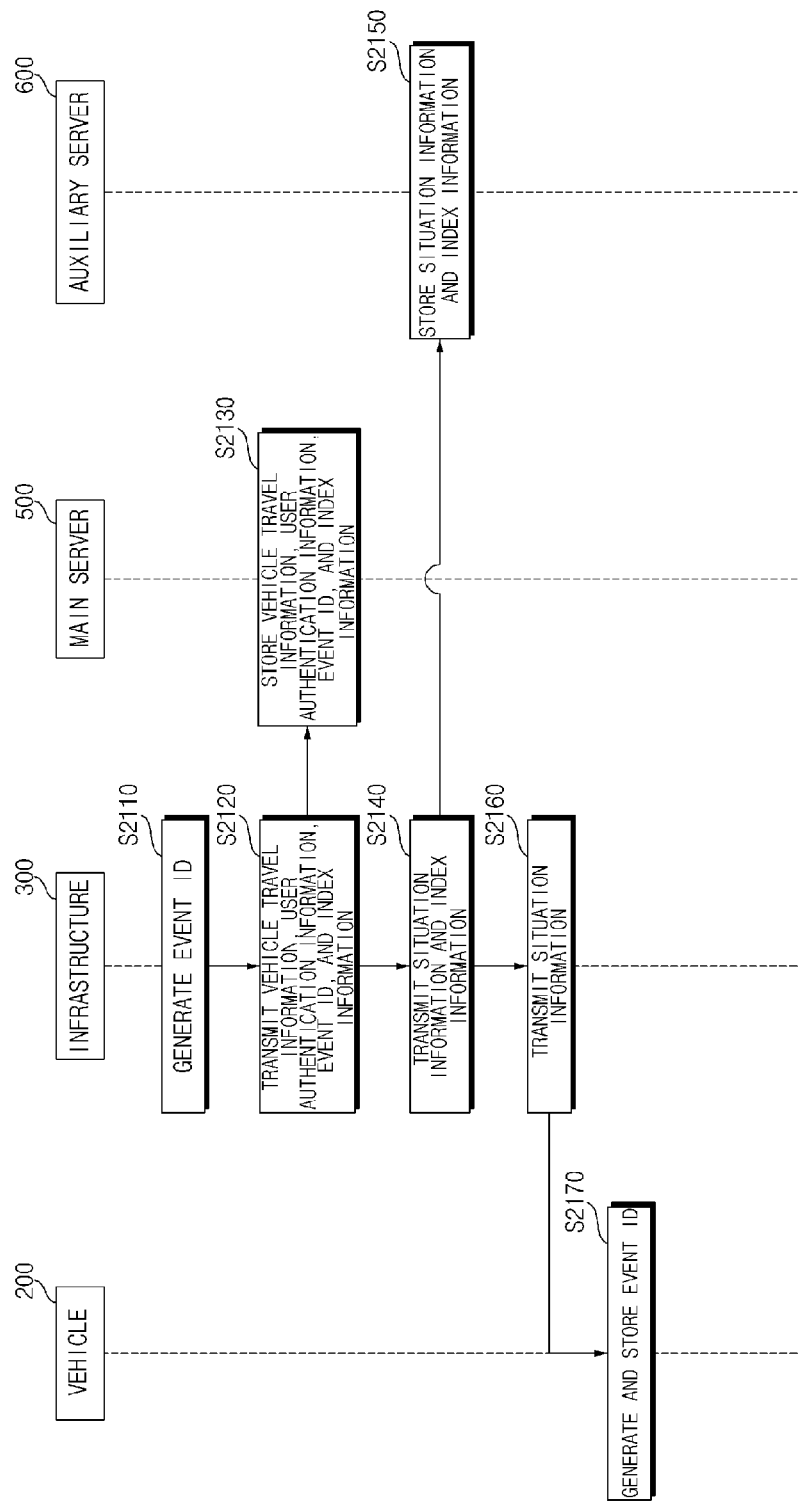
FIG. 11 is a signal flowchart for explanation of a logging step according to another embodiment of the present invention.

FIG. 11 is a signal flowchart for explanation of a logging step according to another embodiment of the present invention.

Referring to FIG. 11, the infrastructure 300 may generate the event ID id (S2110).

Step S2110 may include steps the same or similar to steps S1110 to S1140 in FIG. 7.

The infrastructure 300 may transmit the vehicle travel information dn, the user authentication information cn, the event ID id, and the index information in to the main server 500 (S2120).

The infrastructure 300 may transmit at least some of the situation information sn and the vehicle travel information dn, as the index information in, to the main server 500.

The main server 500 may store the vehicle travel information dn, the user authentication information cn, the event ID id, and the index information in, in the memory 530 (S2130).

The main server 500 may store the vehicle travel information dn, the user authentication information cn, the event ID id, and the index information in, in the memory 530 using a lookup table (LUT) method.

As such, the main server 500 may rapidly find information corresponding to the index information in.

The infrastructure 300 may transmit the situation information sn and the index information to the auxiliary server 600 (S2140).

Although not shown, the infrastructure 300 may also perform step S2140 prior to step S2120.

The auxiliary server 600 may store the situation information sn and the index information in the memory 630 (S2150).

The auxiliary server 600 may store the situation information sn and the index information, in the memory 630 using the LUT method.

As such, the auxiliary server 600 may rapidly find information corresponding to the index information in.

The infrastructure 300 may transmit the situation information sn to the vehicle 200 (S2160).

Although not shown, the infrastructure 300 may transmit situation information to the vehicle 200 (S2160) prior to step S2110 of generating an event ID, step S2120 of transmitting information to the main server 500, or step S2140 of transmitting information to the auxiliary server 600.

The vehicle 200 may generate and store the event ID id based on the user authentication information cn and the situation information sn (S2170).

Although not shown, the vehicle 200 may also receive the event ID id generated by the infrastructure 300, from the infrastructure 300. The vehicle 200 may store the event ID id received from the infrastructure 300, in the memory 230 of the vehicle 200.

Although not shown, the vehicle 200 may store the situation information sn in the memory 230. Upon receiving an inquiry about the event ID id from the inquiry server 400, the vehicle 200 may generate the event ID id. That is, when there is an inquiry from the inquiry server 400, the vehicle 200 may generate the event ID id at this time.

As such, a storage space may be prevented from being used for storing an unnecessary event ID id.

<Inquiring and Responding Step>

Figure 12:
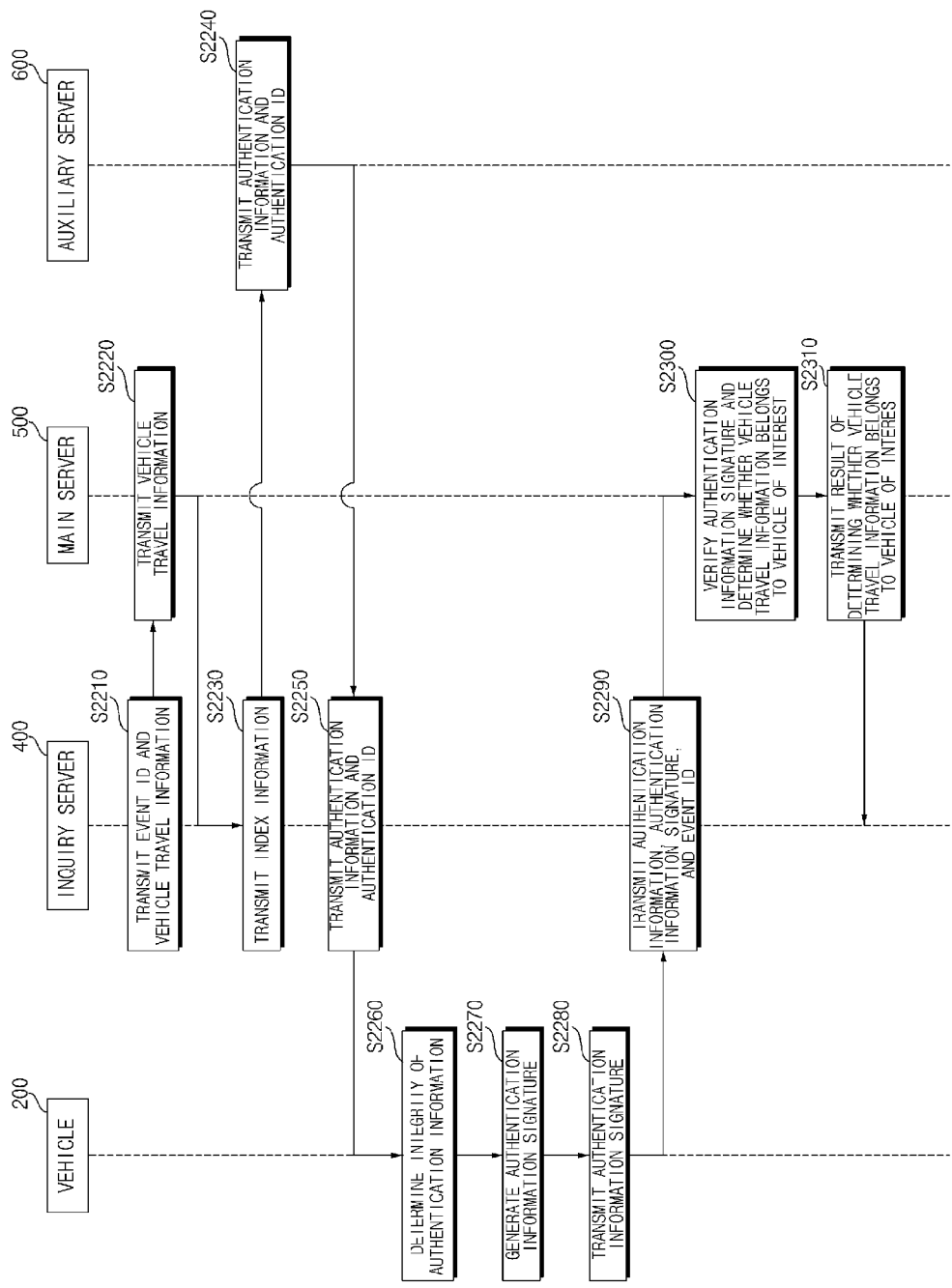
FIG. 12 is a signal flowchart for explanation of an inquiring and responding step according to another embodiment of the present invention.

FIG. 12 is a signal flowchart for explanation of an inquiring and responding step according to another embodiment of the present invention.

Referring to FIG. 12, the inquiry server 400 may transmit the event ID id to the main server 500 and may inquire about the vehicle travel information dn (S2210).

Step S2210 may include steps the same or similar to steps S1210 to 1230 in FIG. 8. However, in steps according to the second embodiment, the central server 100 in steps S1210 to 1230 may be understood to be the main server 500.

The main server 500 may transmit the vehicle travel information dn, corresponding to the event ID id received from the inquiry server 400, to the inquiry server 400 (S2220).

The main server 500 may transmit index information corresponding to the received event ID id with the vehicle travel information dn, to the inquiry server 400.

The inquiry server 400 may transmit the index information in, to the auxiliary server 600 (S2230).

The inquiry server 400 may transmit the index information received from the main server 500, to the auxiliary server 600.

The auxiliary server 600 may transmit authentication information corresponding to the queried index information in, to the inquiry server 400.

The auxiliary server 600 may transmit authentication information corresponding to the queried index information in and an authentication ID generated based on situation information, to the inquiry server 400 (S2240). The auxiliary server 600 may simultaneously transmit the authentication ID to the inquiry server 400 while transmitting the authentication information.

The authentication ID may be information for verifying whether information acquired from the auxiliary server 600 by the inquiry server 400 and transmitted to the vehicle 200 is forged or falsified.

For example, the authentication ID may be a hash value obtained by combining the situation information and the authentication information.

For example, the authentication ID may be a hash value of information obtained by combining at least some of the situation information and at least some of the authentication information.

The inquiry server 400 may receive the authentication information, corresponding to the queried index information in and the authentication ID, from the auxiliary server 600.

The inquiry server 400 may transmit the authentication information and the authentication ID, received from the auxiliary server 600, to the vehicle 200 (S2250).

The vehicle 200 may receive the authentication information and the authentication ID, from the inquiry server 400.

The vehicle 200 may determine the integrity of the authentication information based on the authentication information, the authentication ID, and the situation information (S2260).

The vehicle 200 may determine whether the hash value of the information obtained by combining the authentication information and the situation information matches the authentication ID, and thus may determine the integrity of the authentication information. When the hash value of the information obtained by combining the authentication information and the situation information matches the authentication ID, the vehicle 200 may determine that the authentication information is not forged or falsified.

The situation information sn is simply stored in the auxiliary server 600 and the vehicle 200 but does not reside on the inquiry server 400, and when information transmitted to the vehicle 200 through the inquiry server 400 is forged or falsified, the authentication information or the authentication ID may be changed. Accordingly, upon determining that the value resulting from generating the authentication ID in the same way as the auxiliary server 600 is different from the authentication ID generated by the auxiliary server 600, the vehicle 200 may determine that the authentication information or the authentication ID is forged or falsified.

Upon determining that data is forged or falsified, the vehicle 200 and/or the central server 100 may stop subsequent procedures.

Upon checking the integrity of the authentication information, the vehicle 200 may perform a digital signature on the authentication information using the user private key vk to generate an authentication information signature (S2270).

The vehicle 200 may transmit the generated authentication information signature to the inquiry server 400 (S2280).

The inquiry server 400 may receive the authentication information signature obtained by performing a digital signature on the authentication information using the user private key vk, from the vehicle 200.

The inquiry server 400 may transmit the authentication information, the authentication information signature, and the event ID id, to the main server 500 (S2290).

When inquiring about the vehicle travel information dn, the inquiry server 400 may transmit, to the main server 500, the same event ID id as the event ID id transmitted to the main server 500 with the authentication information and the authentication information signature.

The main server 500 may acquire the authentication information, the authentication information signature, and the event ID id, from the inquiry server 400.

The main server 500 may verify the authentication information signature received from the inquiry server 400, based on the user authentication information corresponding to the queried event ID id. The main server 500 may determine whether the vehicle travel information dn transmitted to the inquiry server 400 belongs to the vehicle corresponding to the queried event ID id (S2300).

The vehicle corresponding to the queried event ID id may be defined as a vehicle of interest. The vehicle of interest may be a vehicle that generates and transmits the event ID id in response to the inquiry from the inquiry server 400.

The main server 500 may transmit the result of determining whether the vehicle travel information transmitted to the inquiry server 400 belongs to the vehicle corresponding to the queried event ID, to the inquiry server 400 (S2310).

The inquiry server 400 may receive the result of determining whether the vehicle travel information do received from the central server belongs to the vehicle 200 corresponding to the queried event ID id, from the central server 100.

The vehicle information inquiry method configured in this way may store different information in a main server and an auxiliary server and may advantageously increase the security of information through a procedure of inquiring about the information.

The vehicle information inquiry method configured in this way may manage a main server for providing vehicle information and an auxiliary server for user authentication, and thus may effectively provide information and may enhance the security of information.

The vehicle information inquiry method may verify the integrity of information provided by a vehicle of interest from a server, and thus may detect whether information generated by a server is forged or falsified while the information is transmitted to a vehicle through a third party (the inquiry server in the present embodiment).

As a result, the vehicle information inquiry method according to the present embodiment may prevent the leakage of personal information of a vehicle and forging/falsification of data, and may advantageously enable a third party to inquire about vehicle information.

The invention can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed:

1. A vehicle information inquiry method comprising:
  acquiring an event ID for sharing anonymized vehicle information and vehicle travel information corresponding to the event ID from an external device, by a central server;
  receiving an inquiry about the event ID and the vehicle travel information corresponding to the event ID from an inquiry server, by the central server; and
  transmitting the vehicle travel information corresponding to the event ID (hereinafter, 'queried event ID') received from the inquiry server to the inquiry server by transmitting authentication information corresponding to the queried event ID to the inquiry server, by the central server, wherein transmitting the vehicle travel information further comprises:
  a first authentication step of acquiring an authentication information signature obtained by performing a digital signature on the authentication information using a user private key, the authentication information, and the event ID from the inquiry server, by the central server;
  a second authentication step of verifying the acquired authentication information signature based on user authentication information corresponding to the queried event ID, and determining whether the vehicle travel information transmitted to the inquiry server belongs to a vehicle corresponding to the queried event ID, by the central server; and
  a third authentication step of transmitting a result of determining whether the vehicle travel information transmitted to the inquiry server belongs to the vehicle corresponding to the queried event ID to the inquiry server, by the central server.

2. The vehicle information inquiry method of claim 1, wherein the vehicle travel information comprises information on at least one of a location, a past route, a predicted route, a speed, passengers, or a control state of a vehicle.

3. The vehicle information inquiry method of claim 1, wherein the event ID is a hash value of data obtained by combining situation information and user authentication information.

4. The vehicle information inquiry method of claim 3, wherein the user authentication information comprises a user public key for verifying authentication information on which a digital signature is performed using a user private key.

5. The vehicle information inquiry method of claim 1, wherein the acquiring an event ID further comprises acquiring vehicle travel information and user authentication information generated by the vehicle, situation information that is periodically generated by an infrastructure of a road, and an event ID generated by the infrastructure of a road based on the vehicle travel information and the user authentication information, by the central server.

6. The vehicle information inquiry method of claim 5, wherein the acquiring an event ID further comprises acquiring the event ID, the vehicle travel information corresponding to the event ID, the situation information, and the user authentication information from the infrastructure, by the central server.

7. The vehicle information inquiry method of claim 6, wherein the acquiring an event ID further comprises storing the acquired event ID, the vehicle travel information corresponding to the event ID, the situation information, and the user authentication information in a lookup table (LUT), by the central server.

8. The vehicle information inquiry method of claim 1, wherein the second authentication step comprises determining that the vehicle travel information transmitted to the inquiry server belongs to the vehicle corresponding to the queried event ID upon determining that a value obtained by decrypting the authentication information signature using a user public key included in the user authentication information is the same as a hash value of the authentication information acquired from the inquiry server, by the central server.

9. The vehicle information inquiry method of claim 1, wherein the central server comprises a main server configured to store the event ID, the vehicle travel information corresponding to the event ID, and user authentication information, and an auxiliary server configured to store situation information and to generate authentication information; and
  wherein index information is stored in each of the main server and the auxiliary server to identify mutually corresponding information in the main server and the auxiliary server.

10. The vehicle information inquiry method of claim 9, wherein transmitting the vehicle travel information further comprises:
- transmitting the vehicle travel information corresponding to the event ID (hereinafter, 'queried event ID') received from the inquiry server to the inquiry server, by the main server;
- transmitting authentication information corresponding to index information (hereinafter, 'queried index information') received from the inquiry server to the inquiry server, by the auxiliary server;
- wherein the first authentication step comprises acquiring the authentication information signature, the authentication information, and the event ID from the inquiry server, by the main server;
- wherein the second authentication step comprises verifying the acquired authentication information signature based on the user authentication information corresponding to the queried event ID and determining whether the vehicle travel information transmitted to the inquiry server belongs to the vehicle corresponding to the queried event ID, by the main server; and
- wherein the third authentication step comprises transmitting a result of determining whether the vehicle travel information transmitted to the inquiry server belongs to the vehicle corresponding to the queried event ID to the inquiry server, by the main server.

11. The vehicle information inquiry method of claim 10, wherein transmitting the vehicle travel information further comprises transmitting the authentication information corresponding to the queried index information, the authentication ID generated based on the situation information to the inquiry server, by the auxiliary server.

12. A vehicle information inquiry method comprising:
- querying an external device about an event ID, by an inquiry server;
- acquiring an event ID from the external device, by the inquiry server;
- transmitting the event ID, and querying a central server about vehicle travel information corresponding to the event ID by transmitting index information to the central server, by the inquiry server, by the inquiry server;
- receiving the vehicle travel information corresponding to the event ID transmitted to the central server from the central server by receiving authentication information corresponding to the index information and authentication ID from the central server, by the inquiry server, by the inquiry server;
- after the receiving the vehicle travel information, transmitting the authentication information and the authentication ID to a vehicle of interest, by the inquiry server;
- receiving an authentication information signature obtained by performing a digital signature on the authentication information using a user private key from the vehicle of interest, by the inquiry server;
- transmitting the authentication information signature, the authentication information, and the event ID to the central server, by the inquiry server; and
- receiving a result of determining whether vehicle travel information received from the central server belongs to a vehicle corresponding to the queried event ID from the central server, by the inquiry server.

13. The vehicle information inquiry method of claim 12, wherein the querying an external device further comprises querying a vehicle of interest or a mobile terminal about an event ID of vehicle travel information of a specific time period or a specific place, by the inquiry server; and
- wherein the acquiring an event ID further comprises acquiring the event ID from the vehicle of interest or the mobile terminal, by the inquiry server.

14. A vehicle information inquiry method comprising:
- a vehicle information generating step of generating and storing vehicle travel information by a controller of a vehicle;
- a vehicle information transmitting step of transmitting vehicle travel information and user authentication information to an external device, by the controller;
- a situation information acquisition step of acquiring and storing situation information from an infrastructure of a road, by the controller;
- an event ID generating step of generating an event ID based on the situation information and the user authentication information, by the controller;
- an event ID transmitting step of transmitting the generated event ID to an inquiry server according to an inquiry from the inquiry server, by the controller;
- after the event ID transmitting step, receiving authentication information and authentication ID from the inquiry server, by the controller;
- determining integrity of authentication information based on authentication information, authentication ID, and situation information, by the controller;
- generating an authentication information signature by performing a digital signature on the authentication information using a user private key, by the controller; and
- transmitting the generated authentication information signature to an inquiry sever, by the controller.

* * * * *